(12) United States Patent
Zhu et al.

(10) Patent No.: US 9,818,445 B2
(45) Date of Patent: Nov. 14, 2017

(54) MAGNETIC STORAGE DEVICE READERS

(71) Applicant: Seagate Technology LLC, Cupertino, CA (US)

(72) Inventors: Wenzhong Zhu, Apple Valley, MN (US); Mehmet F. Erden, St. Louis Park, MN (US); Kenneth A. Haapala, Plymouth, MN (US); Wei Tian, Eden Prairie, MN (US); Edward Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/993,694

(22) Filed: Jan. 12, 2016

(65) Prior Publication Data

US 2017/0200468 A1 Jul. 13, 2017

(51) Int. Cl.
*G11B 20/12* (2006.01)

(52) U.S. Cl.
CPC .. *G11B 20/1217* (2013.01); *G11B 2020/1238* (2013.01)

(58) Field of Classification Search
None
See application file for complete search history.

(56) References Cited

U.S. PATENT DOCUMENTS

| | | |
|---|---|---|
| 4,030,130 A | 6/1977 | Smith |
| 4,152,736 A | 5/1979 | Jansen et al. |
| 4,298,897 A * | 11/1981 | Arter ................ G11B 5/00808 360/39 |
| 4,535,372 A | 8/1985 | Yeakley |
| 4,622,601 A | 11/1986 | Isozaki et al. |
| 4,646,168 A | 2/1987 | Sonobe et al. |
| 4,771,346 A | 9/1988 | Shoji et al. |
| 4,803,571 A * | 2/1989 | Fujioka ................ G11B 5/09 360/121 |
| 4,853,799 A | 8/1989 | Aikawa |
| 5,010,430 A | 4/1991 | Yamada et al. |
| 5,285,341 A * | 2/1994 | Suzuki ................ G11B 5/3103 360/121 |
| 5,402,270 A | 3/1995 | McDonnell et al. |

(Continued)

FOREIGN PATENT DOCUMENTS

| | | |
|---|---|---|
| EP | 0484774 A2 | 5/1992 |
| EP | 1564736 A2 | 8/2005 |

(Continued)

*Primary Examiner* — K. Wong
(74) *Attorney, Agent, or Firm* — Holzer Patel Drennan

(57) ABSTRACT

Implementations described and claimed herein includes a storage device comprising a plurality of readers, including a first subset of readers configured to read a first subset of tracks and a second subset of readers configured to read a second subset of tracks, the first subset of tracks being wider than the second subset of tracks. In another implementation, the readers in the first subset of readers are wider than the readers in the second subset of readers. The wider readers may be configured to recover servo information and the narrow readers may be configured to recover data information. The storage devices may include two-dimensional magnetic recording, conventional perpendicular magnetic recording, shingled magnetic recording, multi-sensor magnetic recording, and interlaced magnetic recording.

20 Claims, 4 Drawing Sheets

(56) References Cited

U.S. PATENT DOCUMENTS

| | | | |
|---|---|---|---|
| 5,760,993 A | 6/1998 | Purkett | |
| 5,892,634 A | 4/1999 | Ito et al. | |
| 5,978,168 A | 11/1999 | Mathews et al. | |
| 6,052,797 A | 4/2000 | Ofek et al. | |
| 6,104,562 A | 8/2000 | Ottesen et al. | |
| 6,185,063 B1 | 2/2001 | Cameron | |
| 6,710,960 B1 | 3/2004 | Yorimitsu | |
| 6,768,605 B2* | 7/2004 | Yamamoto | G11B 5/4886 360/69 |
| 7,095,582 B2* | 8/2006 | Kitahara | G11B 5/00813 360/121 |
| 7,130,152 B1 | 10/2006 | Raymond et al. | |
| 7,259,927 B2 | 8/2007 | Harris | |
| 7,393,066 B2 | 7/2008 | Dugas et al. | |
| 7,440,222 B2 | 10/2008 | Nakamura et al. | |
| 7,508,619 B2 | 3/2009 | Okamoto et al. | |
| 7,573,682 B2 | 8/2009 | Pust et al. | |
| 7,872,829 B2 | 1/2011 | Sakai | |
| 7,907,360 B2 | 3/2011 | Mak et al. | |
| 7,957,093 B2 | 6/2011 | Brand | |
| 7,965,465 B2 | 6/2011 | Sanvido et al. | |
| 8,023,215 B1 | 9/2011 | Ghaly et al. | |
| 8,139,318 B2 | 3/2012 | Biskeborn | |
| 8,310,777 B2 | 11/2012 | Biskeborn et al. | |
| 8,310,782 B2 | 11/2012 | Song et al. | |
| 8,531,792 B1 | 9/2013 | Burd et al. | |
| 8,531,793 B2 | 9/2013 | Bandic et al. | |
| 8,537,481 B1 | 9/2013 | Bandic | |
| 8,599,510 B1 | 12/2013 | Fallone | |
| 8,693,123 B1 | 4/2014 | Guo et al. | |
| 8,699,159 B1 | 4/2014 | Malina | |
| 8,699,162 B1 | 4/2014 | Grobis et al. | |
| 8,711,517 B2* | 4/2014 | Erden | G11B 5/5552 360/121 |
| 8,854,752 B2 | 10/2014 | Jin et al. | |
| 8,867,161 B2 | 10/2014 | Emo et al. | |
| 8,873,178 B2 | 10/2014 | Erden et al. | |
| 8,913,335 B2 | 12/2014 | Coker et al. | |
| 8,917,469 B1 | 12/2014 | Guo et al. | |
| 8,929,186 B1 | 1/2015 | Sharma et al. | |
| 8,976,478 B1 | 3/2015 | Harllee, III et al. | |
| 9,053,712 B1 | 6/2015 | Guo et al. | |
| 9,058,829 B1 | 6/2015 | Wolf et al. | |
| 9,082,458 B1 | 7/2015 | Tang | |
| 9,087,541 B1 | 7/2015 | olharel et al. | |
| 9,099,103 B1 | 8/2015 | Krichevsky | |
| 9,105,302 B1* | 8/2015 | Erden | G11B 20/10268 |
| 9,111,575 B1 | 8/2015 | Zhou et al. | |
| 9,111,578 B1 | 8/2015 | Hassel et al. | |
| 9,129,658 B1 | 9/2015 | Yamamoto | |
| 9,142,232 B2 | 9/2015 | Edelman et al. | |
| 9,142,246 B1 | 9/2015 | Trantham et al. | |
| 9,153,287 B1 | 10/2015 | Hamilton et al. | |
| 9,324,362 B1 | 4/2016 | Gao | |
| 9,396,062 B1 | 7/2016 | Sridhara et al. | |
| 9,418,688 B1 | 8/2016 | Rausch et al. | |
| 9,431,039 B1* | 8/2016 | Li | G11B 5/3912 |
| 2002/0035666 A1 | 3/2002 | Beardsley et al. | |
| 2002/0035704 A1 | 3/2002 | Wilson | |
| 2002/0105867 A1 | 8/2002 | Tamaru et al. | |
| 2003/0214886 A1 | 11/2003 | Sakamoto et al. | |
| 2005/0078399 A1 | 4/2005 | Fung et al. | |
| 2005/0157597 A1 | 7/2005 | Sendur et al. | |
| 2006/0215511 A1 | 9/2006 | Shin et al. | |
| 2007/0047415 A1 | 3/2007 | Chang | |
| 2007/0050593 A1 | 3/2007 | Chen et al. | |
| 2007/0174582 A1 | 7/2007 | Feldman | |
| 2008/0002272 A1 | 1/2008 | Riedel | |
| 2008/0239901 A1 | 10/2008 | Tsunokawa et al. | |
| 2008/0316639 A1 | 12/2008 | Tang et al. | |
| 2009/0244775 A1 | 10/2009 | Ehrlich | |
| 2009/0251821 A1 | 10/2009 | Song et al. | |
| 2010/0014183 A1 | 1/2010 | Aoki et al. | |
| 2010/0027406 A1 | 2/2010 | Krause et al. | |
| 2010/0271727 A1 | 10/2010 | Namkoong et al. | |
| 2010/0321817 A1 | 12/2010 | Aida et al. | |
| 2012/0014013 A1 | 1/2012 | Bandic et al. | |
| 2012/0194946 A1 | 8/2012 | Watanabe et al. | |
| 2013/0148225 A1 | 6/2013 | Coker et al. | |
| 2013/0155826 A1 | 6/2013 | Zhang et al. | |
| 2013/0294207 A1 | 11/2013 | Erden et al. | |
| 2014/0016224 A1 | 1/2014 | Unoki et al. | |
| 2014/0043708 A1 | 2/2014 | Erden et al. | |
| 2014/0055881 A1 | 2/2014 | Zaharris | |
| 2014/0153134 A1 | 6/2014 | Han et al. | |
| 2014/0160589 A1 | 6/2014 | Deki et al. | |
| 2014/0285923 A1 | 9/2014 | Aoki | |
| 2014/0327983 A1 | 11/2014 | Biskeborn et al. | |
| 2015/0178161 A1 | 6/2015 | Burd et al. | |
| 2016/0148630 A1 | 5/2016 | Rausch | |
| 2016/0148635 A1 | 5/2016 | Zhu et al. | |
| 2016/0148636 A1 | 5/2016 | Ma et al. | |
| 2016/0148637 A1 | 5/2016 | Rausch et al. | |
| 2016/0148642 A1 | 5/2016 | Gao | |
| 2016/0148643 A1 | 5/2016 | Gao et al. | |
| 2016/0148644 A1 | 5/2016 | Zhu et al. | |
| 2016/0148645 A1 | 5/2016 | Zhu et al. | |

FOREIGN PATENT DOCUMENTS

| | | |
|---|---|---|
| JP | 2240862 A | 9/1990 |
| WO | 2005-030869 A1 | 4/2005 |

* cited by examiner

MAGNETIC STORAGE DEVICE READERS

SUMMARY

One implementation described and claimed herein provides for a storage device comprising a plurality of readers, including a first subset of readers to read a first subset of tracks and a second subset of readers to read a second subset of tracks, the first subset of tracks being wider than the second subset of tracks. In another implementation, the readers in the first subset of readers are wider than the readers in the second subset of readers. The wider readers may be configured to recover servo information and the narrow readers may be configured to recover data. The storage devices may include two-dimensional magnetic recording, conventional perpendicular magnetic recording, shingled magnetic recording, multi-sensor magnetic recording, and interlaced magnetic recording.

This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter. These and various other features and advantages will be apparent from a reading of the following Detailed Descriptions.

BRIEF DESCRIPTIONS OF THE DRAWINGS

DETAILED DESCRIPTIONS

A hard-disk drive ("HDD") device may contain a number of magnetic storage disks that include a number of concentric data tracks containing the data stored on the device. As the storage capacity of HDD devices increases, the areal density capability ("ADC") of the storage disks may also increase. The ADC of a storage disk has two main components: the number of bits of data that can be squeezed on the disks in along-track direction, measured in bits-per-inch ("BPI"), and the number of data tracks squeezed into a cross-track direction, measured in tracks-per-inch ("TPI"). The ADC may be expressed as the multiplication of BPI and TPI.

Perpendicular magnetic recording ("PMR") technology used widely in HDD devices is approaching its superparamagnetic limit at existing storage densities, which restricts device manufactures from increasing ADC of the storage disks. In addition, alternative recording technologies to the existing PMR technology favor higher TPI more than PMR technology. For example, shingled magnetic recording ("SMR") by design writes narrower tracks. Heat-assisted magnetic recording ("HAMR") light sources also naturally favor high TPI designs, which mean narrower data tracks. Bit-pattern media ("BPM") dots also prefer to be closer to each other for both along-track and cross-track directions.

Reader width scaling represents a major challenge to high TPI designs in the recording media of HDD devices. The design of readers that are narrow enough to fit into the narrow tracks so that they do not read interference from adjacent tracks without losing their required reader signal-to-noise ratio ("SNR") is difficult and readers meeting these requirements may be expensive.

According to the embodiments described herein, storage device systems and apparatus may be implemented to handle high TPI media with readers that are configured to read tracks (or subsets of tracks) of different widths. The readers can be single readers or subsets of readers. In some implementations of the disclosed technology, the readers or subsets of readers are of different widths, and can be configured to perform data and/or servo recovery on tracks of different widths. As a result, the disclosed technology is tailored to the different requirements of data recovery and servo recovery and increases servo track writing width to reduce servo writing time and improve servo performance. The storage devices may include two-dimensional magnetic recording (TDMR), PMR, SMR, multi-sensor magnetic recording (MSMR), and interlaced magnetic recording (IMR).

Figure 1:
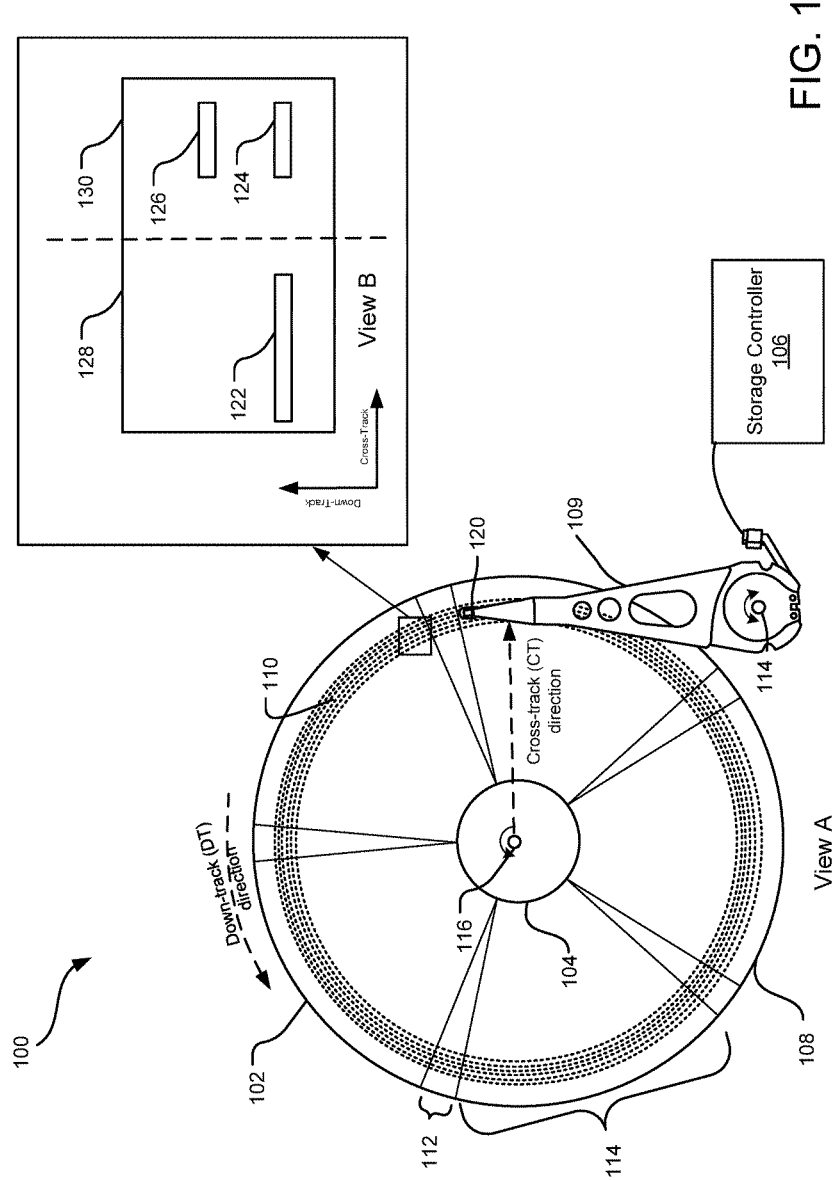
FIG. 1 illustrates a plain view of an example disc drive assembly.

FIG. 1 illustrates a plan view of an example disc drive assembly 100. In View A, the disc drive assembly 100 includes a transducer head assembly 120 with a read/write head (not shown) for writing and reading data to and from a magnetic data storage medium 108.

The transducer head assembly 120 may include a number of reader and writer configurations such as HAMR, multiple read and/or write heads, etc. Although other implementations are contemplated, the magnetic data storage medium 108 is a magnetic storage disc on which data bits can be recorded using a magnetic write pole and from which data bits can be read using a magnetoresistive element (not shown). As illustrated in View A, the magnetic storage medium 108 rotates about a spindle center or a disc axis of rotation 116 during rotation, and includes an inner diameter 104 and an outer diameter 102 between which are a number of concentric data tracks 110. Information may be written to and read from data bit locations in the data tracks on the magnetic storage medium 108.

The magnetic data storage medium 108 includes a number of servo sectors (e.g., a servo sector 112) extending radially between the inter diameter 104 and the outer diameter 102. In one implementation, each of the servo sectors (e.g., servo sector 112) includes embedded information used for track seeking and track following. In particular, the information includes fine head position information used for centerline tracking. Between every two consecutive servo sectors (e.g., servo sector 112) is a wedge (e.g., a wedge 114) that includes partial or multiple sectors (e.g., data sectors and super parity sectors, not shown) of concentric data tracks 110.

The transducer head assembly 120 is mounted on an actuator assembly 109 at an end distal to an actuator axis of rotation 114. The transducer head assembly 120 flies in close proximity above the surface of the magnetic storage medium 108 during disc rotation. The actuator assembly 109 rotates during a seek operation about the actuator axis of rotation 114. The seek operation positions the transducer head assembly 120 over a target data track for read and write operations.

The storage device 100 further includes a storage controller 106. The storage controller 106 includes software and/or hardware, and may be implemented in any tangible processor-readable storage media within or communicatively coupled to the storage device 100. The term "tangible processor-readable storage media" includes, but is not limited to, RAM, ROM EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a processor. In contrast to tangible processor-readable storage media, intangible processor readable communication signals may embody processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

The data storage medium 108 may also have a plurality of readers. A transducer head can use one or more readers to recover data information or read position information. Based on a read signal detected from the data storage medium 108 by the readers, data can be recovered. The readers include read elements located in the read/write head, which read information from the data storage medium 108 by sensing a magnetic field formed on a portion of the surface of the storage medium 108, and may write information to the disk by magnetizing a portion of the surface of storage medium 108.

Referring to View B, an example of a track 128 and a track 130 in a portion of the magnetic data storage medium 108 is shown. The track 128 is shown with one reader 122 and the track 130 is shown with two readers, reader 124 and reader 126, located above the tracks 128 and 130. Multiple magnetic readers or subsets of readers can be selected for specific tasks (e.g., data recovery and servo demodulation). For example, the wider readers (e.g., reader 122) may be configured to servo recovery and the narrow readers (e.g., readers 124 and 126) may be configured to data recovery. In such implementations, a wider width corresponding to the track pitch can be optimal for reading the servo pattern. And, a narrower reader avoids noise interference at the edge of a track but is sensitive to read data. In such implementations, there may be alternating between subsets of readers for different track locations. For example, a wide reader may be used for both wide tracks (e.g., track 128) and servo pattern and a narrow reader may be used for narrow tracks (e.g., track 130). In another example, the wide reader may be use for wide tracks, and the narrow reader may be used for narrow tracks and servo pattern.

In View B, a reader 122 is co-planar to a reader 124 in a cross-track direction of the track, and delegated to servo recovery. In other implementations, the readers can be co-planar, stacked, or any combination. The electrical design allows multiple independent readers or subsets of readers to be utilized simultaneously. In such implementations, a shared shield structure is optional and a common ground is not required. The reader 122 is wider than the reader 124. The reader 124 is delegated to reading tracks. The different sizing and designated performance of a reader 122 and a reader 124 satisfies the different requirements between servo and data, such that servo track width increases and the Servo Track Write (STW) time reduces dramatically without any servo system penalty and complexity due to optimal servo TPI to scale the written servo track TPI to data TPI. By increasing servo track width and reader width, the servo performance is improved, enabling higher servo frequency to improve servo format efficiency and provide more area for data recording.

In View B, one track 128 from the data storage medium 108 is shown. However, the disclosed technology is applicable to multiple tracks with both varying track pitch and width (e.g., one track may be as much as two times the pitch and width of another track). A first track or a first subset of tracks may be wider than a second track or a second subset of tracks. The track pitch and width do not have to be constant (discussed in more detail in the IMR example in FIG. 2).

Figure 2:
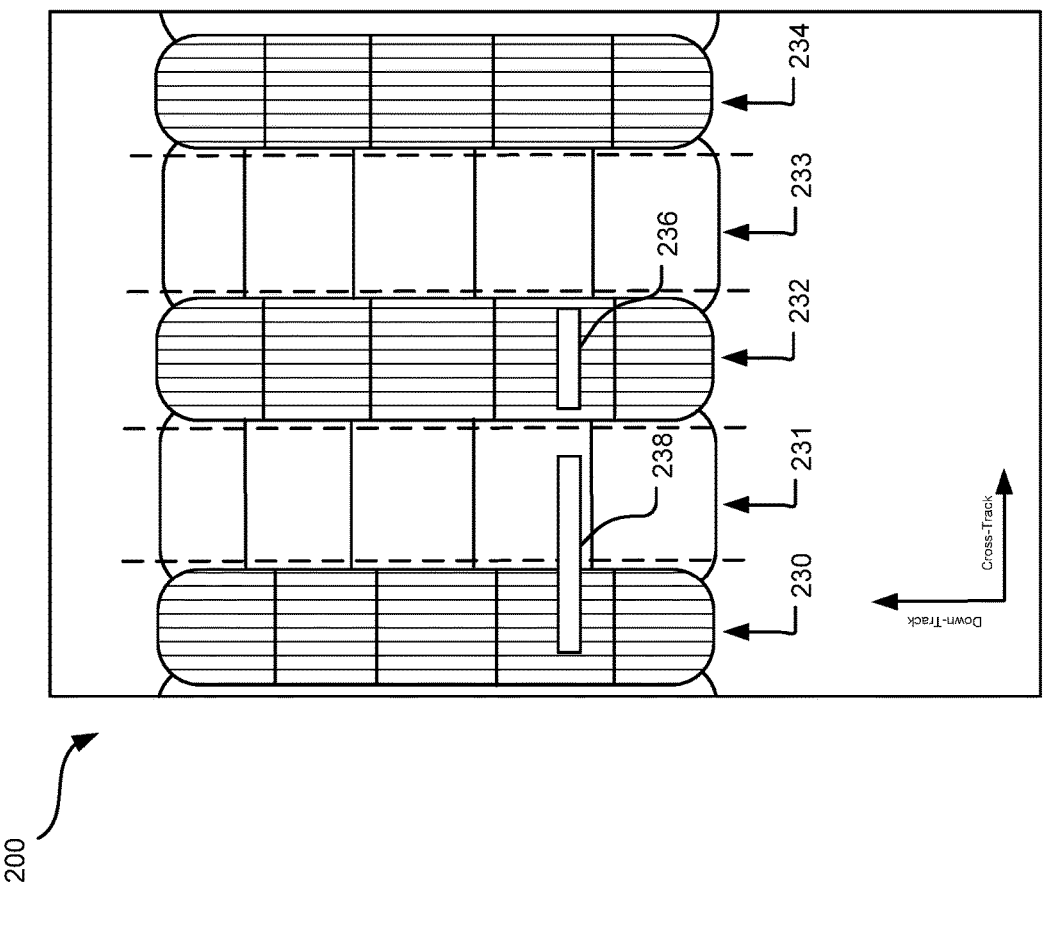
FIG. 2 illustrates example data tracks in a data storage medium.

FIG. 2 shows example data tracks in a storage medium 200. The storage medium 200 includes IMR. IMR generally refers to the concept of utilizing two or more selected written track widths and two or more different linear densities for data writes to alternating data tracks on a storage medium. In IMR systems, data tracks may be read from or written to the data tracks in a non-consecutive order. For example, data may be written exclusively to a first track series including every other data track in a region of a storage medium before data is written to any data tracks interlaced between the tracks of the first series.

In IMR systems, a data track of wide written track width is written prior to directly adjacent data tracks of narrower written track width. The data tracks of the wider written track width are also referred to herein as "bottom tracks," while the alternating data tracks of narrower written width are referred to herein as "top tracks."

In some implementations, the bottom tracks of wider written track width include data stored at a different linear density than one or more top tracks of narrow written track width. In still other implementations (e.g., on a BPM), the bottom and top data tracks are of equal written track width.

IMR data management techniques can be used to boost areal densities and reduce processing overhead as compared to some existing systems (e.g., such as shingled magnetic recording (SMR) systems). Performance gains of IMR systems can be enhanced further by utilizing the illustrated dual-reader design.

Referring to FIG. 2, in the disclosed technology, a wide reader 238 is co-planar to a narrower reader 236 in a cross-track direction of the track, and delegated to servo recovery. The odd tracks (bottom tracks) 231, 233 are written wider than the target track width with high linear density. The even tracks (top tracks) 230, 232, 234 are written narrow with low linear density, and trim the odd tracks. The basic law is the even track is always written after odd track within the same zone.

The bottom tracks 231, 233 can be 3 different widths. For example, the bottoms tracks 231, 233 can be approximately 2 times (2×) the width of the target track when none of the adjacent top tracks are written.

In one implementation of the disclosed technology, the wider reader width is double the width of the narrow reader. The wider reader reads untrimmed bottom track data field and servo data field, and the narrow reader reads the top track and single/double side trimmed bottom data field. Since the wider read width is twice of the reader width for the nominal data track, the servo track width is doubled and the STW time is cut in half. The transition noise is proportional to $$\frac{1}{\sqrt{Wr}}$$

("Wr" defined as reader width). Thus, both servo and untrimmed bottom track SNR improve with a wide reader, improving drive performance and reliability. In another implementation, the wider reader width is 1.5× of the narrow reader. The wider reader reads untrimmed/single-sided trimmed bottom track data field and servo data field, and the narrow reader reads the top track and double-side trimmed bottom data field. MDW width can be increased 50% and reduce STW time by approximately 33%. It also improves drive performance and reliability.

In another example, the bottoms tracks 231, 233 can be approximately 1.5 times (1.5×) the width of the target track when one side adjacent top track is written. In yet another example, bottoms tracks 231, 233 can be approximately the same width as the target track when both side adjacent top tracks are written. For the top tracks 230, 232, 234, the width is always the same as the target track width.

When the track usage is below 50%, all of the tracks are untrimmed bottom track. After the track usage is over 50%, top track is written that trims the bottom track. By applying multi-level IMR, the bottom track width only has two states: 1) untrimmed or one side trimmed when track usage is from 50% and 75% and 2) one side or two sides trimmed when track usage is from 75% to 100%.

Figure 3:
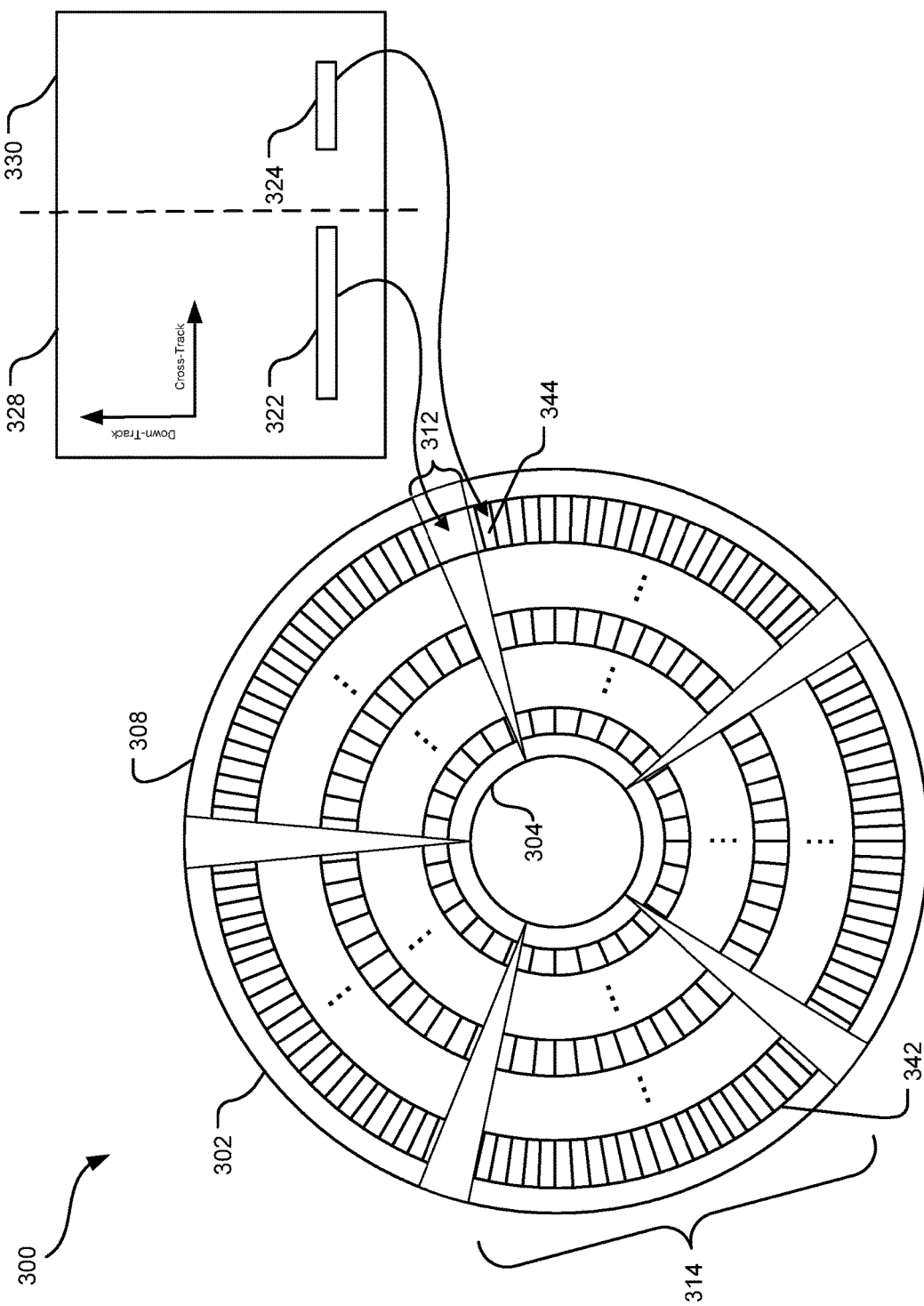
FIG. 3 illustrates example data tracks in a data storage medium.

FIG. 3 shows example tracks in a storage medium 300. Although other implementations are contemplated, data bits can be recorded on the storage medium 300 using a magnetic write pole and from which data bits can be read using a magnetoresistive element (not shown). The magnetic storage media 300 includes a number of servo sectors (e.g., a servo sector 312) extending radially between an inter diameter 304 and outer diameter 302. In one implementation, each of the servo sectors includes embedded information used for track seeking and track following. In particular, the information includes fine head position information used for centerline tracking.

Between every two consecutive servo sectors (e.g., servo sector 312) is a wedge (e.g., a wedge 314) that include a length of multiple data fields (e.g., data fields 342 and 344). A wider reader 322 can be delegated to perform servo recovery on a wider servo sector (e.g., servo sector 312). A narrower reader 324 is delegated to perform data recovery on a narrow track (e.g., data tracks 344). The wider reader 322 is shown on a wider track 328. The narrower reader 324 is shown on a narrower track 330.

FIG. 3 illustrates that in some implementations of the disclosed technology, the readers or subsets of readers are of different widths, and can be configured to perform data and/or servo recovery on tracks of different widths. As a result, the disclosed technology is tailored to the different requirements of data recovery and servo recovery and increases servo track writing width to reduce servo writing time and improve servo performance.

Figure 4:
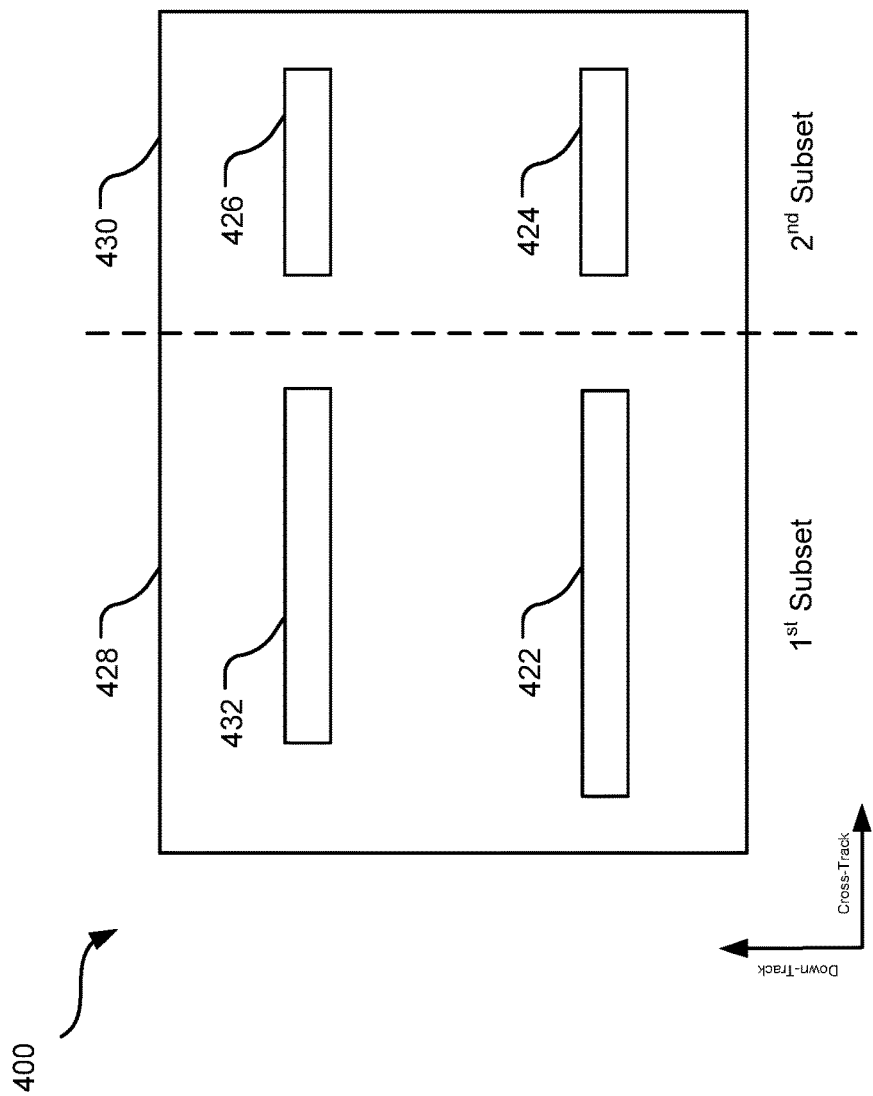
FIG. 4 illustrates example data tracks in a data storage medium.

FIG. 4 shows example data tracks 428 and 430 in a storage medium 400. In some implementations of the disclosed technology, there may be a reader or a first subset of readers used to read a first data track or first subset of data tracks and a second reader or subset of readers used to read a second data track or subset of data tracks. The first track or subset of tracks may be wider than the second track or subset of tracks.

As shown in FIG. 4, there are two data tracks 428 and 430. A data track 428 is wider than a track 430. The disclosed technology is applicable to multiple tracks with both varying track pitch and width (e.g., one track may be as much as two times the pitch and width of another track). The first subset of tracks may be wider than the second subset of tracks. The data track pitch and width do not have to be constant.

A reader 422 and a reader 432 are delegated to read the track 428, which may be a part of a first subset of tracks. A reader 424 and a reader 426 are delegated to read the second track 430, which may be a part of a second subset of tracks.

The reader 422 and the reader 432 are wider readers than the reader 424 and reader 426. In some implementations, the wider readers (e.g., the reader 422 and the reader 432) may be configured to servo recovery and the narrow readers (e.g., the reader 424 and the reader 426) may be configured to data recovery.

In addition to methods and systems, the embodiments of the technology described herein can be implemented as logical steps in one or more computer systems. The logical operations of the present technology can be implemented: (1) as a sequence of processor-implemented steps executing in one or more computer systems; and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A storage device comprising:
   a plurality of readers, including a first subset of readers to read a first subset of tracks and a second subset of readers to read a second subset of tracks, the first subset of tracks being wider than the second subset of tracks and the first subset of readers being wider than the readers in the second subset of readers.

2. The storage device of claim 1, wherein the readers in the first subset of readers are configured to recover servo information in the first subset of tracks.

3. The storage device of claim 1, wherein the readers in the first subset of readers are configured to recover data information in the first subset of tracks.

4. The storage device of claim 1, wherein the readers in the second subset of readers are configured to recover data information in the readers in the second subset of tracks.

5. The storage device of claim 1, wherein the readers in the first subset of readers are co-planar in a cross-track direction to the readers in the second subset of readers.

6. The storage device of claim 1, wherein the readers in the second subset of readers are configured to be 65-105% of a track width of the second subset of tracks.

7. The storage device of claim 1, wherein widths of the readers in the first subset of readers are configured to be 1.5-2 times a width of the second subset of readers.

8. A system comprising:
a transducer head, including two or more readers co-planar in a cross-track direction and configured to read data tracks and servo tracks of different width, the two or more readers including a first reader being wider than a second reader in the cross-track direction.

9. The system of claim 8, wherein a width of the first reader is configured to be 1.5-2 times a width of the second reader.

10. The system of claim 8, wherein the first reader is configured to recover servo information.

11. The system of claim 8, wherein the first reader is configured to recover data information.

12. The system of claim 8, wherein the second reader is configured to recover data information.

13. The system of claim 8, wherein the system is one of a two-dimensional magnetic recording system, a conventional perpendicular magnetic recording system, a shingled magnetic recording system, a multi-sensor magnetic recording system, and an interlaced magnetic recording system.

14. A storage device comprising:
an interlaced magnetic recording system; and
a transducer head with two readers co-planar in a cross-track direction, including a first reader being wider than a second reader in the cross-track direction.

15. The storage device of claim 14, wherein a width of the first reader is approximately 1.5-2 times a width of the second reader.

16. The storage device of claim 14, wherein the first reader is configured to read a single-side trimmed bottom data field.

17. The storage device of claim 14, wherein the first reader is configured to read an untrimmed bottom track data field and a servo data field.

18. The storage device of claim 14, wherein the second reader is configured to read a top track data field and a single-sided trimmed bottom data field.

19. The storage device of claim 14, wherein the second reader is configured to read a top track data field and a double-sided trimmed bottom data field.

20. The storage device of claim 14, the storage device is a hard disk drive.

* * * * *